United States Patent [19]

Bartoli

[11] Patent Number: 4,802,013
[45] Date of Patent: Jan. 31, 1989

[54] METHOD OF TRANSFERRING INFORMATION FROM THE FRONT TO THE BACK OF A DOCUMENT, AND APPARATUS FOR PERFORMING THE METHOD

[76] Inventor: Bernard M. Bartoli, Lieudit "Le Buat", 78490 Bazoches Sur Guyonne, France

[21] Appl. No.: 830,646

[22] Filed: Feb. 18, 1986

[30] Foreign Application Priority Data

Jun. 22, 1984 [FR] France .................................. 84 09834

[51] Int. Cl.$^4$ .............................................. H04N 1/21
[52] U.S. Cl. ................................................... 358/296
[58] Field of Search .............. 235/449, 432, 487, 475; 400/124; 355/146; 358/296, 300, 298; 346/76 PH

[56] References Cited

U.S. PATENT DOCUMENTS 4,027,142  5/1977  Paup et al. ............................. 346/75
4,158,909  6/1979  Eirem et al. ......................... 400/124

Primary Examiner—Clifford C. Shaw
Attorney, Agent, or Firm—Steele, Gould & Fried

[57] ABSTRACT

A method of transferring information from the front of a document (1) constituting an integral part of a strip (2) to the back of said document. The method consists in reading at least some of the information on the front of the document by means of a reader (5) disposed opposite said front and connected to control a printer (6) disposed opposite the back thereof, information sent by the reader is used to control the printer via an electronic circuit without individual processing of the sensed information. The document may be a document such as an identity card or a credit card where identical information is to appear both on the front and on the back of the card.

6 Claims, 3 Drawing Sheets

METHOD OF TRANSFERRING INFORMATION FROM THE FRONT TO THE BACK OF A DOCUMENT, AND APPARATUS FOR PERFORMING THE METHOD

The present invention relates to a method of transferring information from the front to the back of a document, and particularly, but not exclusively intended for use with security documents such as identity cards, credit cards, cards for providing identification or access, etc. The invention also relates to apparatus for performing the method. This problem frequently arises for this type of document where at least some information, such as the name of the holder and the expiry date, for example, is to appear on both sides of the document.

BACKGROUND OF THE INVENTION

Modern identity cards are presently manufactured as follows: an application for a document is made on a form, generally a card form, hereinafter referred to as the "Application Form", and the form includes a photograph together with information such as date of birth, address, occupation, issue and expiry dates, applicant's signature, family information, serial number, the location of an establishment, the signature of the responsible authority, etc., and this "word" information is advantageously prepared and printed on the application form by computerized machinery; once the application form has been completed, the filled-in portion (including the photograph) intended to appear on the final identity card is photographed as a whole. This zone of information to appear on the front of the final card is referred to hereafter as the "useful zone".

The negative obtained in this way is used to transfer said information onto a positive security medium, i.e. a medium which is previously prepared in such a way as to make it difficult to reproduce, e.g. by means of special weft insertions, a special chemical composition, moiré type patterning, etc. The final document is then fabricated by a purely physico-chemical process without there being any risk of error, since both the negative and the positive medium are perforated to enable them to be tractor driven through the machinery.

This method does not enable information on the front of the document to be transferred to the back. In order to do this, complex document management is necessary, including storing the information to be printed on the back, turning over the document and then reproducing said information by means of a printer which is required to reproduce said information some suitable length of time after the operations on the front of the document. This gives rise to manufacturing difficulties which are particularly acute when the machinery is started, or whenever the machinery is interrupted in the middle of operation due to some technical incident or a power cut. Further, turning the document over introduces a discontinuity in the continuous manufacturing process and this is unacceptable when large numbers of documents are to be manufactured.

Further, the information to be transferred to the back of the document can only be transferred after the photographic development operations on the front of the document have been completed. Such photographic operations require the document to be passed through various baths, and there is no guarantee that prior-printed information will survive passing through such photographic baths without being damaged. Also, it has not been possible to provide photographic processing of both sides of the document simultaneously using a process which is simple enough for industrial automation.

Preferred implementations of the present invention remedy these drawbacks and provide a method and apparatus in which information is printed on the basis of reading the front of the document and synchronously with said reading, thereby avoiding any risk of error due to mismanaging the information, which is, of course, particularly advantageous when producing security documents.

The present invention seeks to transfer or copy characters or signs to the back of a document by substantially identically reproducing characters or signs appearing on the front of the document.

SUMMARY OF THE INVENTION

According to the present invention the method of transferring information from the front to the back of a document consists in modifying a chain in which documents are manufactured by moving flat through the chain, by incorporating in said chain a device for reading the front of a document and connected to a servo control circuit which controls a printer whose print head is disposed to print on the back of the document.

Thus, information read from the front of a sheet is directly printed on the back thereof. Since the document moves past the reader device, the reader device is advantageously linear in structure. Naturally, the printer has a corresponding linear structure, i.e. it may be constituted by a matrix printer having a column of print elements such as needles or ink jets, with said column being disposed perpendicularly to the direction of document travel, and parallel to the sensitive area of the reader which is advantageously constituted by a strip of photodiodes. The number of print elements (e.g. needles) is limited and a print head may include only nine needles, for example, per line of print. Generally speaking, the reader definition is much greater than nine points per line of printing so that n points from the reader are associated with a single write point, and a logic stage is used to calculate the average value of the n read points corresponding to a single write point.

In a first embodiment, the information to be reproduced on the back of the card is duplicated on the front of the application form (e.g. a request for an identity card) in an auxiliary zone thereof to one side of the useful zone, the combination of useful zone plus auxiliary zone is then photographed. This combination therefore appears in the negative and subsequently on the positive. The auxiliary zone is read by a line reader and information detected thereby is reproduced on the back of the final document by the back printer.

However, this embodiment leads to a loss of paper both in the negative and in the positive, and further requires additional cutting steps to separate the auxiliary zone from the useful zone.

In a second embodiment, the front of the document is made in the conventional manner, i.e. no auxiliary zone is provided. In this embodiment, the information for printing on the back of the document is read directly from the application form. The information for the back is stored and is reconstituted by the back printer onto the back of the corresponding final document after the document has moved along a path having a length of N cards +N intercard spaces. With this embodiment it is necessary to provide a memory, but, in accordance with the invention, the information concerned is not processed since it is merely stored in a buffer for a certain length of time. In this embodiment, the reader is disposed above the application form while the back printer is disposed further downstream in the manufacturing machine.

In a third embodiment, the information to be copied to the back of the document is read directly from the front of the final document after the application form has been photographically reproduced thereon, and in this case the printer may naturally be disposed directly beneath the reader. Naturally, the reader only reads a predetermined zone of the card which contains information solely in the form of alphanumeric symbols capable of being read, even though there is a loss of definition between the printing on the front and the back.

BRIEF DESCRIPTION OF THE DRAWINGS

Embodiments of the invention are described by way of example with reference to the accompanying drawings in which.

MORE DETAILED DESCRIPTION

Figure 1:
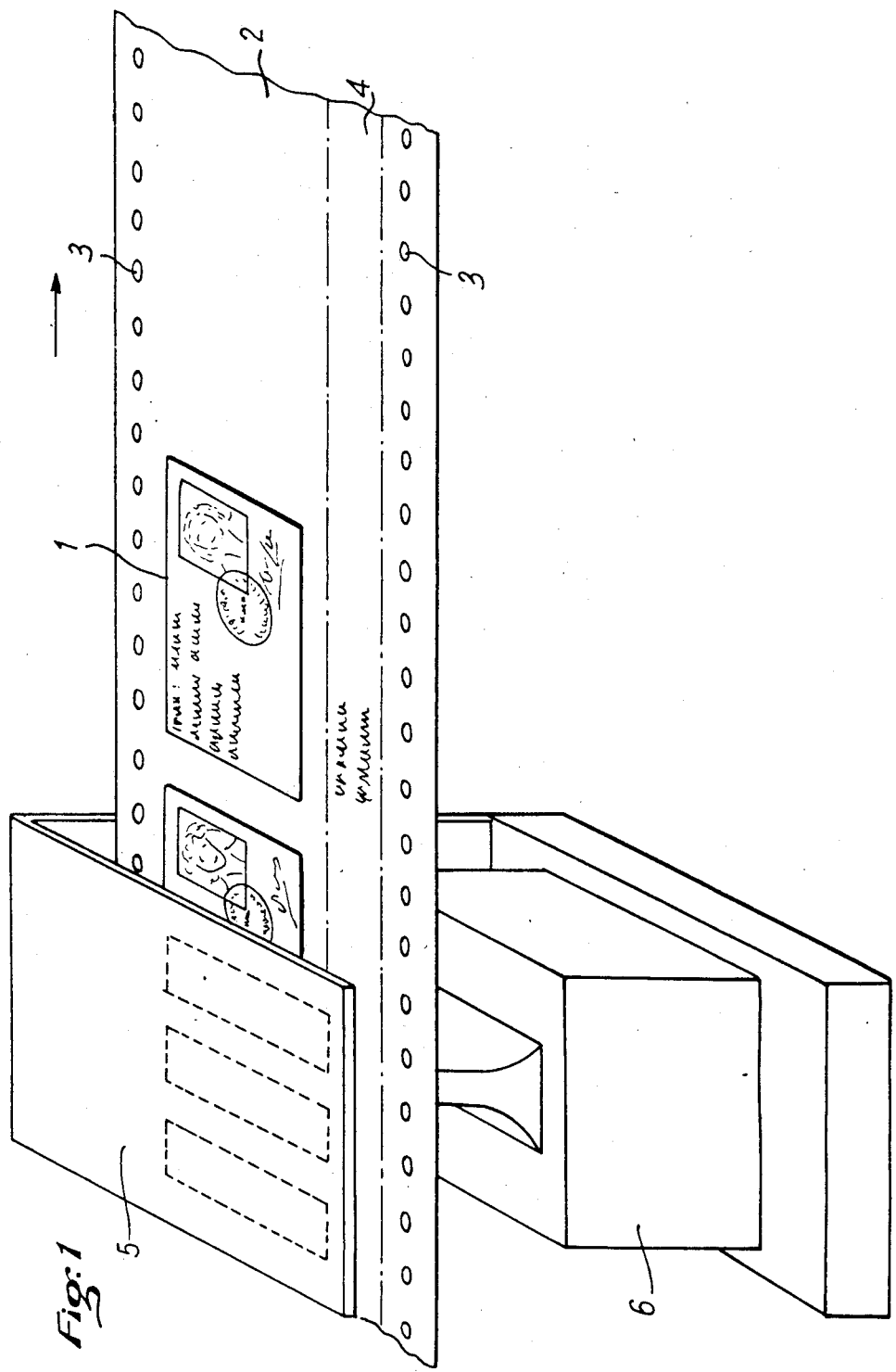
FIG. 1 is a diagrammatic perspective view of apparatus in accordance with the invention.

The main components of apparatus in accordance with the invention can be seen in FIG. 1. Documents 1 being manufactured are in the form of a strip 2 which is driven in known manner, by perforations 3 on the sides of the strip which cooperate with conventional tractor wheels (not shown).

The information to be copied onto the back of the documents may, for example, constitute the name of the bearer, the expiry date, and a document serial number. In a first embodiment, this information is to be found in an auxiliary zone of the application form and after photography and development it appears in a zone 4 on the top face of the strip 2 adjacent to the image of the front of the document. The strip 2 runs through a reader stage 5 which is associated with a printer 6, and the printer 6 is disposed immediately below the reader 5 and on the opposite side of the strip 2.

Figure 2:
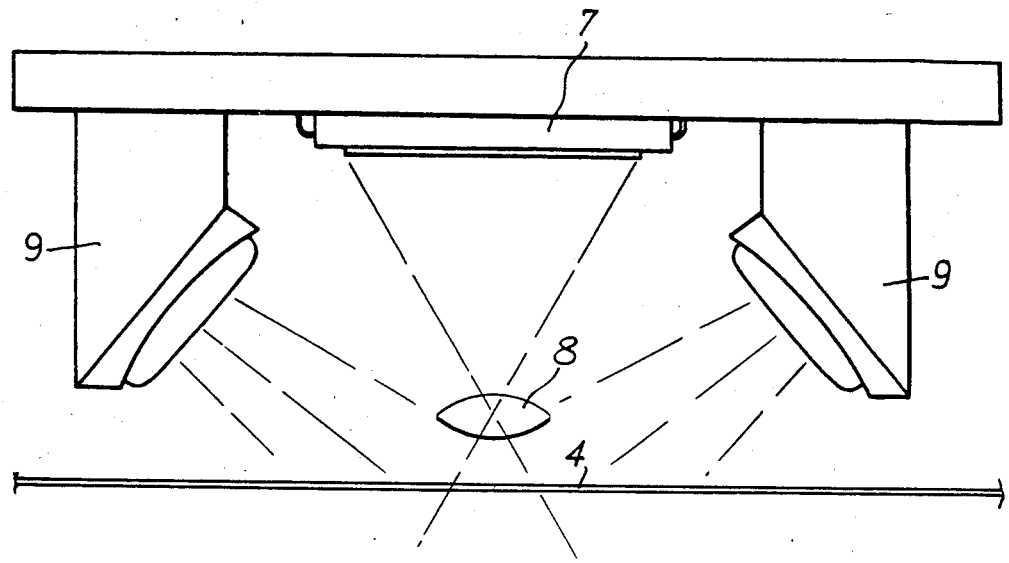
FIG. 2 is a diagram of a reader.

The reader stage 5 is shown diagrammatically in FIG. 2. It comprises a commercially-available line sensor 7 whose sensitive area may be constituted by a strip of 128 photodiodes, for example. Naturally, the number of photodiodes is a function of the height of the zone to be scanned and thus of the number of lines to be copied.

In FIG. 2, the direction of strip movement is arbitrarily considered as being from the right of the figure towards the left. The image of the strip 4 is projected onto the sensitive area 7 by optics 8 symbolized by a converging lens. The sensor is intended to scan the characters to be reproduced in columns at the speed of movement of the strip 2, 4. Depending on the type of diode making up the strip, the region to be read may need to be illiminated, for example by means of two lamps 9 disposed on either side of the optics 8. The focal length of the optics 8 is chosen as a function of the physical ratio between the length of the strip 7 and the height of the characters to be reproduced or the combined height of the lines of characters to be reproduced when a plurality of lines are to be reproduced.

Figure 3:
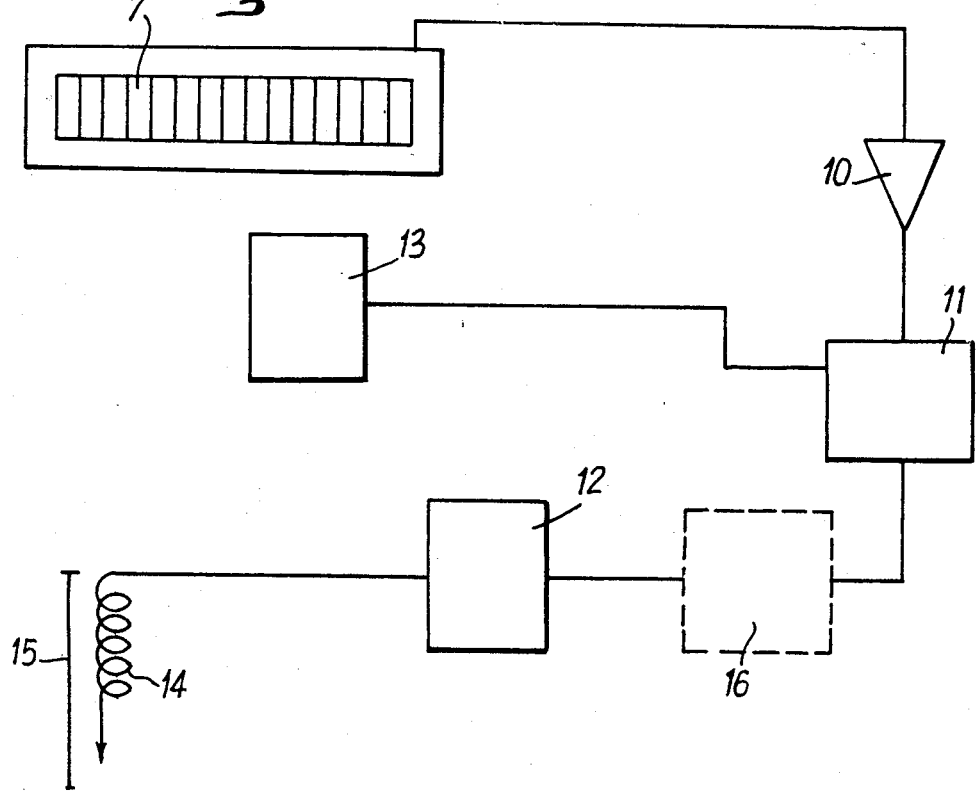
FIG. 3 is a block diagram of a printer servo control circuit.

FIG. 3 is a block diagram of a servo control circuit for controlling the printer on the basis of the information sent by the reader. The sensitive area 7 of the reader is connected to a threshold amplifier 10 suitable for distinguishing between black and white, where black may correspond to a value "1" and white to a value "0". The result is stored in a register 11 which serves as a read memory and which is driven by a clock 13. In the more general case where the number of read points is greater than the number of write points, the register stage 11 includes means for determining the average value of n read points in order to generate a single write point. The clock 13 is connected both to the register 11 and also to control the movement of the paper by a link not shown. Thus, the clock imposes a regular speed of advance on the paper 2 and also serves to take account of the inertia of the print heads. The output signal from the register 11 is amplified by a current amplifier 12 (e.g. a Darlington type amplifier) and is applied to the electromagnets 14 for driving print needles 15. Naturally, a circuit of the type described is provided for each group of sensor points corresponding to a single printer point, there being a one-to-one correspondence therebetween. A single clock circuit 13 is common to all said circuits.

In this first embodiment, as in the third embodiment mentioned above, the printer 6 is disposed directly beneath the reader 5. Thus, the description of the first embodiment is applicable to the third embodiment except that the third embodiment does not have an auxiliary zone 4 and the reader is disposed above the final document rather than the auxiliary zone 4. In the second embodiment (not shown), the reader 5 is disposed above the application form, i.e. upstream from the machine which photographically produces the final documents, whereas the printer is disposed beneath the strip 2 inside the machine but downstream from the photographic processes. In this case, a memory stage 16 (see FIG. 3) delays the transmission of information to the printer 6 by a period which is predetermined to correspond to the time taken for the final document to engage the back printer.

The main purposes of the present invention is to copy some of the information from the front of a document to the back. No change of scale is necessary. However, it is possible by purely optical means to magnify or to reduce the characters or symbols which are to be copied to the back of the document. A magnifying or reducing operation could also be performed electronically in the stage 16 shown in dashed lines in FIG. 3. The stage 16 could also include an encoding stage, so as to encode the characters read on the front of the document into conventional magnetically readable characters such as CMC characters or into optically readable characters such as OCRB characters.

Figure 4:
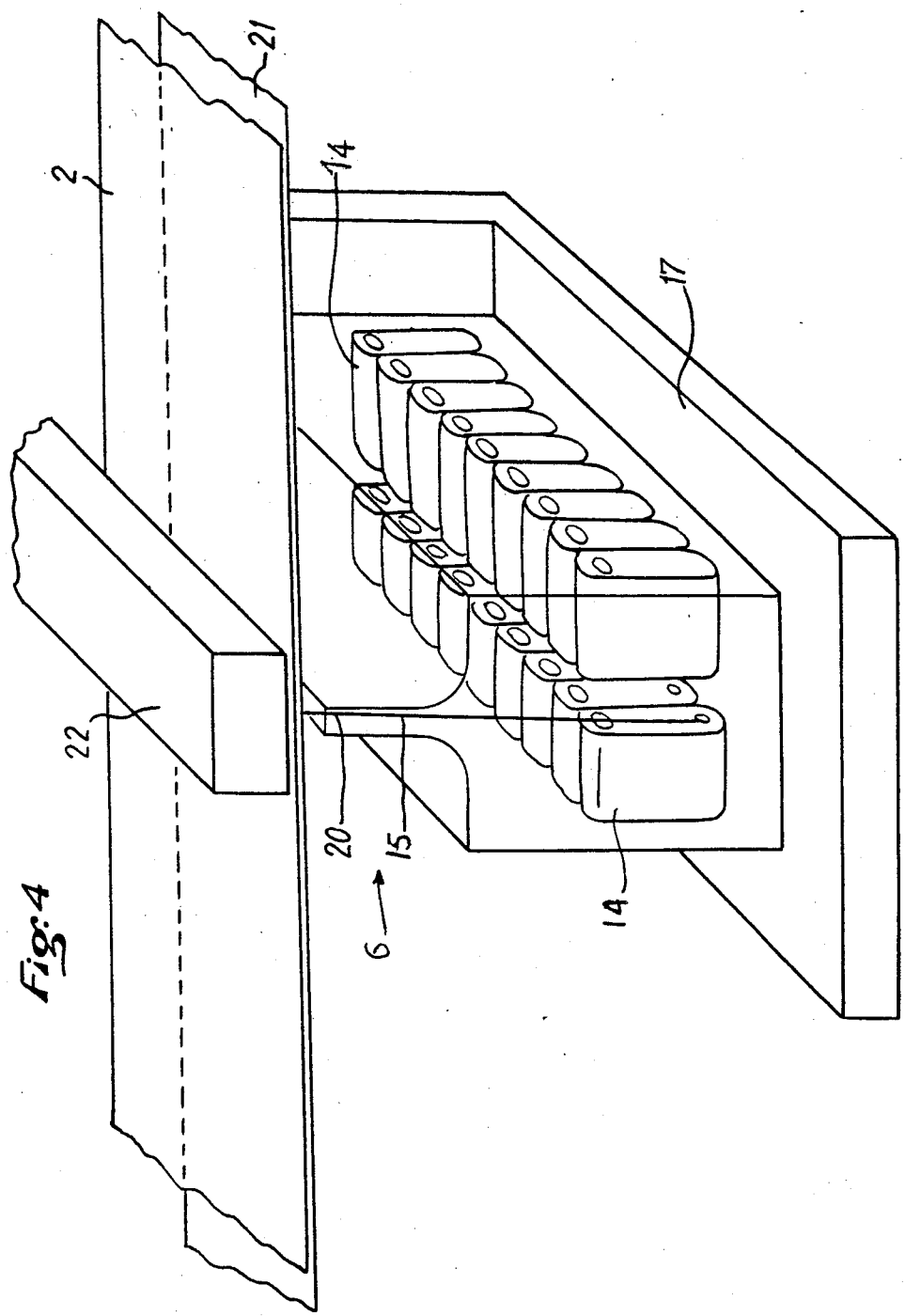
FIG. 4 is a diagrammatic perspective view of a back printer for performing the invention.

FIG. 4 shows a print head 6 having needles 15. Such print heads are known. However, they are usually designed to write line by line with each head being capable of printing seven points one above the other. A drawback with known heads is that it is practically impossible to reproduce more than one line on a small document.

According to a characteristic of the present invention, the transfer apparatus includes a special printer, referred to as a "back printer" which uses the printing technique of needles striking an ink ribbon. As can be seen in FIG. 4, a set of electromagnets 14 are disposed on a support 17, with each electromagnet being connected to a corresponding register 11 (FIG. 3) in such a manner as to establish a direct relationship between a group of read points and a single write point (assuming there is no intervening processing). Each electromagnet 14 drives a needle 15 which slides in a bearing 20 (preferably a ruby) in order to strike an ink ribbon 21 against an anvil 22. The strip 2 on which the document 1 appears passes between the ink ribbon 21 and the anvil 22. The electromagnets 14 are disposed side by side on either side of the strike plane of the needles 15. Naturally the needle points remain in a fixed position relative to the other needle points and to the structure of the machine. Return members (e.g. springs) are provided but not shown in FIG. 4. It is thus possible to build up a multiline printer capable, for example, of printing four lines, of sufficiently small size to be compatible with the desired result. Such a printer is capable of simultaneously reproducing one to four lines of characters.

A matrix printer using needles is not an essential feature of the invention, and other matrix printers may be used, operating on various other systems, e.g. an ink jet printer.

Naturally numerous variations can be made without going beyond the scope of the invention. In particular, the method of transferring information from the front to the back of the document is completely independent of the processes which may be applied thereto prior to printing on the back.

I claim:

1. A method of transferring information from the front side of a strip to the back side of the strip wherein the front side of the strip consists of a photographic support comprising moving the strip at a constant velocity in a security document manufacturing machine, photographically applying the information to a first zone on the said front side, optically reading the first zone of the front side of the strip by a stationary reader facing said strip, controlling a line printer by the optical reader via an electronic circuit, and without data processing imprinting information on the said back of the strip directly under the optical reader by utilizing a line printer.

2. A method of transferring information according to claim 1, from the front of a document which constitutes an integral portion of a strip, to the back of said document, the method consisting in reading some of the information on the front of the document by means of a reader disposed opposite the front, and in controlling a printer disposed opposite the back of the document as a function of the information sent by the reader and conveyed by means of an electronic circuit.

3. A method for transferring information according to claim 2, wherein an auxiliary zone is provided on the front of the appliation form, wherein said auxiliary zone has the information to be reproduced on the back of the document, and wherein said information is read by a reader.

4. A method according to claim 1, wherein the reader includes a linear sensor suitable for establishing a one-to-one relationship between each write point and a corresponding read point or group of read points.

5. A method according to claim 1, wherein said electronic circuit includes means for encoding the detected signals.

6. A method according to claim 1, wherein the information to be transferred is imprinted on the front of the strip in an auxiliary zone lying outside the document.

* * * * *

UNITED STATES PATENT AND TRADEMARK OFFICE
CERTIFICATE OF CORRECTION

PATENT NO. : 4,802,013

DATED : January 31, 1989

INVENTOR(S) : Bernard M. Bartoli

It is certified that error appears in the above-identified patent and that said Letters Patent is hereby corrected as shown below:

In Column 3, line 62, change "illiminated" to
--illuminated--.

Signed and Sealed this

Eighth Day of May, 1990

Attest:

HARRY F. MANBECK, JR.

Attesting Officer      Commissioner of Patents and Trademarks